3,151,161
NITROSOANILINONITROALKANES
Darrell D. Mullins, Nitro, and Lloyd A. Walker, St. Albans, W. Va., assignors to Monsanto Chemical Company, St. Louis, Mo., a corporation of Delaware
No Drawing. Filed Jan. 9, 1961, Ser. No. 81,243
8 Claims. (Cl. 260—577)

The present invention relates to nitrosoanilinonitroalkanes, to methods for their preparation and to promoting reaction of vulcanizable elastomers and reinforcing pigment by means of nitrosoanilinonitroalkanes.

It has long been known that rubbers may be altered by thermal treatment of an admixture with a relatively high proportion of reinforcing pigment, usually carbon black. The time required for external treatment may be materially shortened by carrying out the thermal interaction in the presence of organic catalysts or promoters. However, the alteration in properties is neither uniform nor necessarily even advantageous. Chemicals which catalyze the thermal treatment of one rubber may be severely detrimental to another. Some catalysts active in natural rubber proved inert in less saturated rubber like butyl rubber. Others useful for improving the hysteresis properties of butyl rubber gave little or no benefit with the more unsaturated rubbers and caused objectionable side reactions, as for example cross linking. The action of catalysts for low hysteresis processing has been explained on the basis of promoting reaction between rubber and carbon black. While the improved adjuvants provided by the present invention are presumed to function by similar mechanisms and are therefore described as promoters, this is not really known. The invention is not limited to any theory of the mechanism by which the new compounds impart the desirable properties hereinafter described in detail.

An object of the invention is to provide new chemicals which promote the low hysteresis of rubber vulcanizates. A general object of the invention is to improve the properties of natural and synthetic rubbers by means of special treating agents. Another object is to provide agents which increase the modulus, lower the torsional hysteresis and decrease the internal friction of rubber vulcanizates. A specific object is to promote reaction between rubber and carbon black or other reinforcing pigment by organic chemical catalysts. A further object is to provide promoters uniformly effective in rubber-carbon black mixtures. A further specific object is to improve dispersion of carbon black and other fillers in rubber.

Improved vulcanizates are obtained according to the present invention by incorporating into the rubber mixture a relatively large amount of reinforcing pigment, a small amount of a nitrosoanilinonitroalkane as hereinafter disclosed in detail and heating the mixture. Amounts of 0.1–5.0% of the rubber hydrocarbon comprise the practical useful range under most conditions. These are not the absolute limits and measurable effects are obtained with even smaller amounts. Similarly, larger amounts can be used but usually without advantage. The preferred range is 0.25–1.0%. Vulcanizing and other ingredients as desired are added, preferably after mixing rubber, reinforcing pigment and promoter. Any vulcanizing ingredients present during thermal interaction must be present in amounts below those which cause cure. In general, heat treatment can be carried out in an oven without mechanical agitation of the mixture.

Another method is by heat treating the rubber mixture, reinforcing pigment and nitrosoanilinonitroalkane while subjecting it to mechanical agitation as in a Banbury mixer or on a mill. Heating is preferably within the range of 300–370° F. with heating times ranging from one minute to 16 hours. It is desirable to pre-heat the Banbury to at least 300° F. before charging the rubber and catalyst. The heat of mixing even with full cooling raises the temperature 20 to 40 degrees higher depending upon the initial temperature. The process can be completed in a normal mixing cycle after which vulcanizing ingredients are added. For plant scale operation short mixing cycles are desired.

Any of the rubber reinforcing pigments may be used in the practice of the present invention. These include reinforcing silica but carbon blacks are preferred. The amount and type of carbon black can be varied within wide limits. Usually it will be in the range of 25 to 100% of the rubber and normally 40–50 parts by weight in the case of tread stocks. Carbon black is generally added first in the mixing cycle and in the usual practice of the invention the promoter is added concomitantly with it. On the other hand, the promoter may be pre-mixed with the carbon black and the mixture added to rubber. Alternatively, rubber and promoter are admixed followed by the carbon black and other ingredients as desired. However, the thermal treatment must be conducted in the presence of reinforcing pigment. Banbury mixing is advantageous because it exerts severe masticating action and achieves uniform dispersion of the ingredients within short mixing times. The dispersing action of the new compounds is pronounced.

The nitrosoanilinonitroalkanes of this invention contain a nitro substituent beta to the amino nitrogen, a methylene group attached to nitrogen and a nitroso substituent in the para position of the anilino radical. All three structural features are critical. For example, corresponding compounds lacking either the nitro or nitroso radical or in which the methylene group is replaced by methyl substituted methylene are in general inactive for promoting reaction of butyl rubber and carbon black. Surprisingly, the nitro substituent increases thermal stability of the molecule. Nitrosoanilinonitroalkanes of this invention possess the general formula

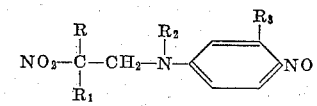

R is hydrogen, lower alkyl,

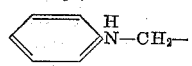

or

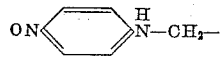

$R_1$ is hydrogen or lower alkyl or taken together R and $R_1$ are alkylene. R and $R_1$ preferably are not hydrogen. $R_2$ is hydrogen, lower alkyl or nitroso and $R_3$ is hydrogen, halogen, or alkyl. These compounds form readily in high yields from simple raw materials. They are preferably made by synthesizing the corresponding N-nitroalkyl aniline as described by Johnson in Jour. Am. Chem. Soc., 68, 14–18 (1946), and treating the resulting product with a nitrosating agent.

The following examples are illustrative but not limitative of the preparation of the new compounds.

Example 1

To 32 grams (0.137 mole) of N-(1-nitrocyclohexylmethyl)aniline in 200 ml. of isopropyl alcohol at 25–30° C. was added dropwise in 10 minutes 16.4 grams (0.16 mole) of concentrated hydrochloric acid. The mixture was then cooled to 25° C. and a solution of 10 grams (0.137 mole) of 98% sodium nitrite in 25 ml. of water added dropwise in 10 minutes at 25–30° C. The reaction mixture was stirred at this temperature for an hour, cooled to 0–5° C. and the solid collected by filtration. The precipitate was washed with water until free of chlorides and air dried at room temperature to yield 34 grams of product. After recrystallization from dilute acetone solution it melted at 110–111° C. To 26.3 grams (0.1 mole) of the N-(1-nitrocyclohexylmethyl)-N-nitrosoaniline thus prepared in 200 ml. of acetic acid was added dropwise with stirring at 25–30° C. 100 grams (1.0 mole) of concentrated hydrochloric acid. After the addition, which required 30 minutes, the reaction was stirred at 25–30° C. for 3 hours, added to 2000 ml. of ice-water and pH adjusted to 8 by addition of concentrated ammonium hydroxide. After stirring for 30 minutes, the solid was collected by filtration, washed with water until free of chlorides and air dried at room temperature. N-(1-nitrocyclohexylmethyl)-p-nitrosoaniline was obtained in 100% yield as a light green solid. After recrystallization from ethyl alcohol it melted at 142–143° C. Analysis gave 15.83% nitrogen compared to 15.96% calculated for $C_{13}H_{17}N_3O_3$.

Example 2

To a stirred mixture of 31.5 grams (0.174 mole) of N-(2-nitropropyl)aniline and 200 ml. of glacial acetic acid at 25–30° C. was added dropwise in 10 minutes 31 grams (0.31 mole) of concentrated hydrochloric acid. To the resulting slurry was added slowly by means of a powder funnel in 5 minutes 12.5 grams (0.174 mole) of finely divided 97% sodium nitrite. After stirring for 30 minutes at 25–30° C., 100 grams (1.0 mole) of concentrated hydrochloric acid was added dropwise to the reaction mixture over a period of 30 minutes. Stirring was continued for 3 hours at 25–30° C. after which time the reaction was discharged into 2500 ml. of ice-water and neutralized to a pH of 8 with concentrated ammonium hydroxide. After stirring for 30 minutes, the dark green solid was removed by filtration, washed with water and air dried at room temperature. N-(2-nitropropyl)-p-nitrosoaniline was obtained in 74.3% yield melting at 121–124° C.

Example 3

A mixture of 37 grams (0.144 mole) of 3-chloro-N-(2-methyl-2-nitropropyl)aniline and 200 ml. of glacial acetic acid was heated to a maximum temperature of 40° C. to form a solution. The solution was then cooled to 25° C. and 17.3 grams (0.173 mole) of concentrated hydrochloric acid added dropwise at 25–30° C. over a period of 5 minutes. Then at this same temperature range 10.3 grams (0.144 mole) of 97% sodium nitrite dissolved in 20 ml. of water was added dropwise at 25–30° C. over a period of 15 minutes. The reaction mixture was stirred for 3 hours at 25–30° C., warmed to 35° C., stirred for an additional hour and then discharged into 2500 ml. of ice-water. Concentrated ammonium hydroxide was then added until a pH of 8 was reached. After stirring for 30 minutes, the product was removed by filtration, washed with water and air dried at room temperature. 3-chloro-N-(2-methyl-2-nitropropyl)-4-nitrosoaniline was obtained as a light green solid melting at 106–109° C. after recrystallization from methyl alcohol. Analysis gave 16.87% nitrogen compared to 16.31% calculated for $C_{10}H_{12}ClN_3O_3$.

Example 4

To 350 grams of a 41% solution of methyl alcohol and hydrochloric acid at 0–5° C. was added dropwise in 20 minutes 76.5 grams (0.37 mole) of N-(2-methyl-2-nitropropyl)-N-methylaniline. After standing for 10 minutes, 27 grams (0.37 mole) of sodium nitrite was added in one portion. After removing external cooling, the temperature rose to 35° C. in 25 minutes. The reaction mixture was stirred for 4 hours at 25–35° C., discharged into 2500 ml. of ice-water and isolated as described above. N-(2-methyl-2-nitropropyl)-p-nitroso-N-methylaniline was obtained as a brown solid in 40% yield. After recrystallization from ethyl alcohol it was a bright green solid melting at 124.5–126.5° C. Analysis gave 17.62% nitrogen compared to 17.71% calculated for $C_{11}H_{15}N_3O_3$.

Example 5

To a stirred mixture of 74 grams (0.382 mole) of N-(2-nitrobutyl)aniline and 200 ml. of glacial acetic acid at 25–30° C. was added dropwise over a 10 minute period 46 grams (0.46 mole) of concentrated hydrochloric acid. To the resultant slurry at 25–30° C. was added slowly by means of a powder funnel in 10 minutes 27.2 grams (0.382 mole) of finely divided, 97% sodium nitrite. The reaction mixture was stirred for an additional 30 minutes at this temperature range, cooled to 25° C. and 200 grams (2.0 moles) of concentrated hydrochloric acid added dropwise over a 45 minute period. Stirring was continued for 3 hours at 25–30° C., the solid collected by filtration and washed with ether. The dry salt cake was discharged into 2500 ml. of ice-water, neutralized to a pH of 8 with concentrated ammonium hydroxide and stirred for 30 minutes. The green solid was removed by filtration, washed with cold water until the washings were neutral to litmus and air dried at room temperature. N-(2-nitrobutyl)-p-nitrosoaniline was obtained melting at 100.5–101.5° C. after recrystallization from ethyl alcohol. Analysis gave 18.72% nitrogen compared to 18.83% calculated for $C_{10}H_{13}N_3O_3$.

Example 6

To a stirred mixture of 33.4 grams (0.15 mole) of N-(2-methyl-2-nitropropyl)-4-nitrosoaniline and 200 ml. of glacial acetic acid at 10–20° C. was added dropwise in 10 minutes 20 grams (0.2 mole) of concentrated hydrochloric acid. To the resultant slurry at 10–20° C. was added dropwise in 10 minutes 11 grams (0.15 mole) of 97% sodium nitrite dissolved in 35 ml. of water. The reaction mixture was stirred for 90 minutes at 25–30° C., filtered and washed free of chlorides with water. The N,4-dinitroso-N-(2-methyl-2-nitropropyl)aniline was obtained in 81.5% yield. After recrystallization from ethyl alcohol the green crystals melted at 90–91° C. Analysis gave 21.84% nitrogen compared to 22.18% calculated for $C_{10}H_{12}N_4O_4$.

Example 7

A mixture of 38.8 grams (0.2 mole) of N-(2-methyl-2-nitropropyl)aniline and 200 ml. of glacial acetic acid was heated to 35° C. to form a solution. The solution was then cooled to 25° C. and 25 grams (0.25 mole) of concentrated hydrochloric acid added dropwise at 25–30° C. over a period of 10 minutes. After stirring the thick slurry at 25–30° C. for 10 minutes, 16 grams (0.23 mole) of 97% sodium nitrite dissolved in 25 ml. of water was added dropwise at 25–30° C. over a period of 30 minutes. Stirring was continued at 25–30° C. for 30 minutes, after which time 150 grams (1.5 moles) of concentrated hydrochloric acid was added dropwise at 25–30° C. in 30 minutes. The resulting mixture was stirred at 25–30° C. for 3 hours, the solid removed by filtration and washed with ethyl ether. The dry salt cake was then added to 2500 ml. of ice-water and concentrated ammonium hydroxide added at 0–15° C. until a pH of 8 had been reached. After stirring for 1 hour at 10–20° C., the resulting solid was removed by filtration, washed with water until the washings were neutral to litmus and air dried. There was obtained a green solid in 58.5% yield. The N-(2-methyl-2-nitropropyl)-p-nitrosoaniline, melting at 131–132° C., analyzed 18.36% nitrogen compared to 18.83% calculated for $C_{10}H_{13}N_2O_3$.

A yield of 96.5% was obtained employing 100 ml. of methyl alcohol as the solvent and 55 grams (1.51 moles) of anhydrous hydrogen chloride. After recrystallization from ethyl alcohol, the product melted at 131–132° C.

*Example 8*

A mixture of 34.33 grams (0.1 mole) of N,N'-dinitroso - N,N' - diphenyl - 2 - methyl - 2 - nitro - 1,3 - propanediamine and 350 ml. of glacial acetic acid was heated to 40° C. The near solution which resulted was then cooled to 25° C. and 200 grams (2.0 moles) of concentrated hydrochloric acid added dropwise at 25–30° C. over a period of 30 minutes. The cooling means was then removed and stirring continued for three hours. The maximum temperature reached during this period was 33° C. The complete solution obtained was divided into two equal parts and each part was poured into 2500 ml. of ice-water and neutralized to a pH of 8 with concentrated ammonium hydroxide. The neutralized mixtures were then stirred for 30 minutes and the solid products filtered, washed with water and air dried at room temperature. N,N' - bis(p - nitrosophenyl) - 2 - methyl - 2 - nitro - 1,3-propanediamine was obtained as a light green solid melting at 142.3° C. after washing with hot ethyl alcohol. The yield was 96.5% of product analyzing 19.86% nitrogen compared to 20.39% calculated for $C_{16}H_{17}N_5O_4$.

As illustrative of the desirable properties imparted to rubber compositions by the new adjuvants, examples thereof were added along with carbon black and styrene-butadiene copolymer rubber to a Banbury mixer. SBR 1500 rubber, 1400 parts by weight, was charged to the Banbury mixer and mixed for 3 minutes at 77° F. The test material was then added to a portion, 400 parts by weight, of the rubber from the Banbury mixer. The addition was made on the differential rolls of a rubber mill at 122° F. The stock was milled for about 5 minutes and cut several times from side to side to obtain adequate dispersion. The milled portion containing the test material was then added to the remainder of the stock in the Banbury together with carbon black. The Banbury mixer was heated to 212° F. before making these additions. Banbury mixing was continued for a total of 6 minutes at 212° F. and the stocks then dumped and passed six times through a rubber mill at 122° F. Vulcanizable stocks were compounded on the mill at 122° F. by adding stearic acid, zinc oxide, hydrocarbon oil softener, sulfur, antioxidant and accelerator. These were then compared to a similarly prepared stock without the chemical additive. The completed formulations were as follows:

| Stock | Parts by weight | |
|---|---|---|
| | A | B |
| SBR 1500 | 100 | 100 |
| Chemical additive | | 0.5 |
| Carbon black (HAF) | 50 | 50 |
| Zinc oxide | 4 | 4 |
| Stearic acid | 2 | 2 |
| Hydrocarbon oil softener | 10 | 10 |
| N-Cyclohexyl-N'-phenyl-p-phenylenediamine | 1.5 | 1.5 |
| N-tert.-Butyl-2-benzothiazolesulfenamide | 1.2 | 1.2 |
| Sulfur | 1.75 | 1.75 |

The stocks were cured in the usual manner by heating in a press 45 minutes at 291.2° F. The modulus of elasticity at 300% elongation was determined in the usual manner. Torsional hysteresis was determined at room temperature with an apparatus which embodied a torsional pendulum. In this apparatus the sample of rubber tested supplied the force to restore the pendulum when it was deflected. This supplied a measure of the energy not returned on torsional deformation. One-half the logarithmic decrement of the observed amplitude was recorded. Heat rise from the base temperature after flexing in a Goodrich flexometer at 212° F. was also determined. Typical results are recorded below:

| Chemical Additive | 300% Modulus | Torsional Hysteresis | Heat Rise, ° C. |
|---|---|---|---|
| None | 2,350 | 0.103 | 21 |
| N-(2-Nitropropyl)-p-nitrosoaniline | 2,400 | 0.091 | 20 |
| N-(2-Nitrobutyl)-p-nitrosoaniline | 2,520 | 0.092 | 19 |
| 3-Chloro-N-(2-methyl-2-nitropropyl)-p-nitrosoaniline | 2,260 | 0.097 | 20 |
| N-Methyl-N-(2-methyl-2-nitropropyl)-p-nitrosoaniline | 2,540 | 0.086 | 18 |
| N-(2-Methyl-2-nitropropyl)-p-nitrosoaniline | 3,040 | 0.081 | 19 |
| N,N'-Bis-(p-nitrosophenyl)2-methyl-2-nitro-1,3-propanediamine | 2,620 | 0.088 | 19 |

The new adjuvants are especially useful for compounding blends of natural rubber and SBR copolymer rubber. Due to the poorer hysteresis properties of the synthetic as compared to the natural product, it is not feasible to make thick articles subject to severe stress, as for example large truck tires, from synthetic rubber. Excessive heat accumulates during use causing early failure. However, for reasons of economy it is common to admix natural rubber with the synthetic product but the amount of synthetic which can be used depends upon the hysteresis properties of the mixture. The practice of the present invention permits the use of higher amounts of synthetic than would otherwise be feasible. As illustrative of the advantages obtained from blends of rubbers, a mixture of 70 parts natural rubber and 30 parts styrene-butadiene copolymer rubber treated with carbon black and promoter was compared to a natural rubber control. The mixture, 1400 parts by weight, was charged to a Banbury mixer and mixed for 5 minutes at 77° F. The chemical to be tested was then added to a 400 parts by weight portion of the rubber from the first step on a rubber mill at 158° F. The stock was milled for about 5 minutes and cut several times from side to side to obtain adequate dispersion. The milled portion containing the test material was then added to the remainder of the stock in the Banbury mixer together with carbon black. The mixer was heated to 302° F. before making these additions. Banbury mixing was continued for a total of six minutes at 302° F. and the stocks then dumped and passed six times through a rubber mill at 158° F. The remaining ingredients were added on the mill at 158° F. The natural rubber control was prepared by masticating the rubber three minutes in a Banbury at 77° F. The masticated rubber and carbon black were then added to a pre-heated Banbury at 302° F. and mixed for three minutes, the Banbury swept down and mixing continued for another three minutes. The composition was then transferred to a rubber mill at 158° F. and passed six times through the mill. Remaining ingredients were added on the mill. The final compositions were as follows:

| Stock | Parts by weight | | | |
|---|---|---|---|---|
| | C | D | E | F |
| Natural rubber | 100 | | | |
| Natural rubber-SBR (70/30) | | 100 | 100 | 100 |
| N-(1-Nitrocyclohexylmethyl)-p-nitrosoaniline | | 0.5 | | |
| N-(2-Methyl-2-nitropropyl)-p-nitrosoaniline | | | 0.5 | |
| N,4-Dinitroso-N-(2-methyl-2-nitropropyl)aniline | | | | 0.5 |
| Carbon black | 50 | 50 | 50 | 50 |
| Zinc oxide | 5 | 4.7 | 4.7 | 4.7 |
| Stearic acid | 3 | 2.7 | 2.7 | 2.7 |
| Hydrocarbon oil softener | 3 | 5 | 5 | 5 |
| N-tert.-Butyl-2-benzothiazolesulfenamide | 0.5 | 0.71 | 0.71 | 0.71 |
| Sulfur | 2.5 | 2.18 | 2.18 | 2.18 |

The stocks were vulcanized by heating 45 minutes at 291.2° F. and physical properties tested with the results recorded below. Scorch determinations were carried out at 249.8° F. with a Mooney plastometer. The minutes required for ten points rise above the minimum values were recorded:

| Stock | 300% Modulus | Ult. Elong. | Mooney Scorch at 121° C. | Torsional Hysteresis |
|---|---|---|---|---|
| C (control) | 2,880 | 390 | 32.8 | 0.082 |
| D | 3,280 | 350 | 45.3 | 0.072 |
| E | 3,330 | 330 | 40.8 | 0.061 |
| F | 3,130 | 350 | 51.7 | 0.074 |

A mixture of equal parts by weight of natural rubber and SBR copolymer rubber treated with carbon black and promoter was compared to a natural rubber control. A mixture of equal parts natural and SBR copolymer rubber was blended for three minutes in a Banbury mixer at 77° F. The promoter was mixed with 700 grams of carbon black by thorough shaking in a large bottle. The carbon black and promoter mixture together with 1400 grams of the rubber mixture from the first step were added to a pre-heated Banbury mixer at 212° F. The composition was masticated for three minutes, the Banbury swept down and mastication continued for another three minutes. The composition was then transferred to a rubber mill at 158° F. and passed six times through the mill. Remaining ingredients were then added on the mill. The natural rubber control was prepared as in the previous natural rubber-SBR copolymer blend. Further demonstration of the invention was carried out employing a stock with a promoter concentration of 0.25 part. The completed formulations were as follows:

| Stock | Parts by weight | | |
|---|---|---|---|
| | G | H | J |
| Natural rubber | 100 | | |
| Natural rubber-SBR (50/50) | | 100 | 100 |
| Chemical promoter | | 0.5 | 0.25 |
| Carbon black (HAF) | 50 | 50 | 50 |
| Zinc oxide | 5 | 4.5 | 4.5 |
| Stearic acid | 3 | 2.5 | 2.5 |
| Hydrocarbon oil softener | 3 | 6.5 | 6.5 |
| N-Cyclohexyl-N'-phenyl-p-phenylenediamine | 1.5 | 1.5 | 1.5 |
| N-tert.-Butyl-2-benzothiazolesulfenamide | 0.5 | 0.85 | 0.85 |
| Sulfur | 2.5 | 2.13 | 2.13 |

The stocks were cured in the usual manner by heating in a press for 45 minutes at 291.2° F. The resulting properties are recorded below:

| Stock | 300% Modulus | Torsional Hysteresis | Mooney Scorch at 249.8° F. |
|---|---|---|---|
| G | 2,910 | 0.072 | 29.6 |
| H | 3,080 | 0.062 | 36.6 |
| J | 3,200 | 0.066 | 42.0 |

The chemical adjuvants of this invention, while especially applicable to natural rubber and butadiene-styrene copolymer rubber and mixtures thereof, are useful in synthetic rubbery homopolymers of aliphatic conjugated diene hydrocarbons, as for example cis-polybutadiene, cis-polyisoprene and in synthetic rubbery copolymers containing 50% or more of such diolefin hydrocarbons copolymerized with copolymerizable monoolefinic which includes, besides styrene, acrylonitrile and monovinylpyridine. The compounds also improved the hysteresis properties of butyl rubber. Butyl rubber-carbon black compositions comprising

| Stock | Parts by weight | |
|---|---|---|
| | K | L |
| Butyl rubber (a copolymer of 97.5% isobutylene and 2.5% isoprene) | 100 | 100 |
| Carbon black (super abrasion furnace) | 26 | 26 |
| N-(2-Methyl-2-nitropropyl)-p-nitrosoaniline | | 0.5 | were prepared in a Banbury mixer preheated to a temperature of 284° F. After heating and mixing the compositions for five minutes there was added

| | | |
|---|---|---|
| Zinc oxide | 5 | 5 |
| Stearic acid | 1 | 1 |
| Hydrocarbon oil softener | 10 | 10 |
| Carbon black (super abrasion furnace) | 14 | 14 | and mixing continued for another one and one-half minutes. The Banbury was then swept down and mixing continued for two minutes. The stocks were then transferred to a rubber mill at 158° F. and blended with the vulcanizing ingredients comprising

| | | |
|---|---|---|
| Tellurium diethyldithiocarbamate | 1 | 1 |
| 2,2'-Dithiobis(benzothiazole) | 1 | 1 |
| Sulfur | 0.75 | 0.75 |

The stocks were vulcanized by heating 45 minutes at 307° F. and physical properties tested with the results recorded below:

| Stock | 300% Modulus | Torsional Hysteresis |
|---|---|---|
| K | 690 | 0.175 |
| L | 950 | 0.136 |

Butyl rubber which is a copolymer of at least 85% isobutylene and a small amount, not more than 15%, of diolefin, as for example isoprene, butadiene or piperylene, is normally deficient in resilience and the foregoing data demonstrate that new compounds of this invention may be used advantageously to improve resilience. The optimum amount will depend upon the particular stock used. Within limits increasing the dosages further improves resilience. To illustrate this property stocks were made up in which butyl rubber was treated with various amounts of the promoter. Carbon black was premixed with the promoter and the carbon black-promoter mix added to butyl rubber on a Banbury mixer preheated to 302° F. Mixing was carried out in the Banbury for ten minutes, the Banbury dumped and final compounding carried out on a rubber mill. The formulations were as follows:

| Stock | Parts by weight | | | |
|---|---|---|---|---|
| | M | N | O | P |
| Butyl rubber | 100 | 100 | 100 | 100 |
| Channel black (EPC) | 35 | 35 | 35 | 35 |
| Furnace black (HAF) | 15 | 15 | 15 | 15 |
| N-(2-Methyl-2-nitropropyl)-4-nitrosoaniline | | 1 | 1.5 | 2 |
| Zinc oxide | 5 | 5 | 5 | 5 |
| Tetramethylthiuram disulfide | 1 | 1 | 1 | 1 |
| 2,2'-Dithiobis(benzothiazole) | 1 | 1 | 1 | 1 |
| Sulfur | 2 | 2 | 2 | 2 |

Vulcanization was carried out by heating in a press for 45 minutes at a temperature of 307° F. The vulcanizates were then tested and the results obtained are shown below:

| Stock | 300% Modulus | Torsional Hysteresis | Heat Rise °C. |
|---|---|---|---|
| M | 1,770 | 0.178 | 33 |
| N | 2,050 | 0.107 | 23 |
| O | 2,200 | 0.096 | 21 |
| P | 2,140 | 0.078 | 21 |

These data demonstrate increasing resilience as the dosage of catalyst is increased. Improvement in resilience is independent of the curing system used. Decreasing the sulfur and accelerator levels lowered the modulus but torsional hysteresis was not significantly changed. Comparable improvements in resilience are obtained with other curing systems following heat treatment promoted by the new compounds, as for example peroxide curing agents, quinone dioxime curing agents and dinitrosobenzene. Also, it will be appreciated that the new compounds have obvious utility as intermediates. They are useful for preparation of complex amines by reduction of the nitroso and nitro radicals.

It is intended to cover all changes and modifications of the examples of the invention herein chosen for purposes of disclosure which do not constitute departures from the spirit and scope of the invention.

What is claimed is:

1. A compound possessing the formula

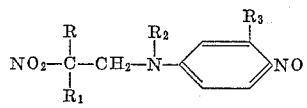

where R is selected from the group consisting of hydrogen, lower alkyl,

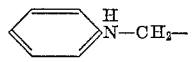

and

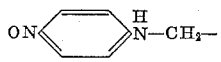

$R_1$ is selected from the group consisting of hydrogen and lower alkyl and taken together with the carbon to which they are attached R and $R_1$ represent lower cycloalkyl, $R_2$ is selected from the group consisting of hydrogen, lower alkyl and nitroso and $R_3$ is selected from the group consisting of hydrogen, chlorine and alkyl.

2. A compound possessing the formula

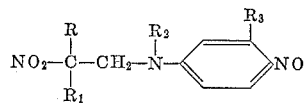

where R and $R_1$ are lower alkyl, $R_2$ is hydrogen and $R_3$ is chlorine.

3. A compound possessing the formula

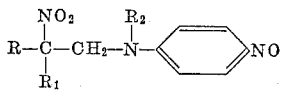

where R and $R_1$ are lower alkyl and $R_2$ is hydrogen.

4. A compound possessing the formula

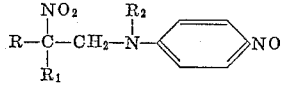

where R and $R_1$ are lower alkyl and $R_2$ is nitroso.

5. A compound possessing the formula

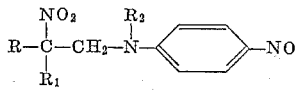

where R and $R_1$ are lower alkyl and $R_2$ is methyl.

6. A compound possessing the formula

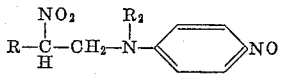

where R is lower alkyl and $R_2$ is hydrogen.

7. A compound possessing the formula

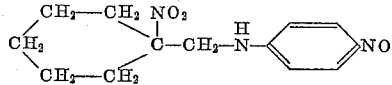

8. A compound possessing the formula

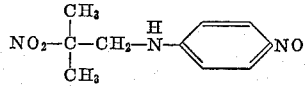

References Cited in the file of this patent

UNITED STATES PATENTS

| 420,311 | Poirrier | Jan. 28, 1890 |
| 2,495,774 | Roberts | Jan. 31, 1950 |
| 2,623,024 | Barton | Dec. 23, 1952 |
| 2,710,287 | Barton et al. | June 7, 1955 |